United States Patent [19]

Schirmer

[11] 4,448,792

[45] May 15, 1984

[54] PASTEURIZABLE AND COOK-IN SHRINK BAG CONSTRUCTED OF A MULTILAYER FILM

[75] Inventor: Henry G. Schirmer, Spartanburg, S.C.

[73] Assignee: W. R. Grace & Co., Cryovac Division, Duncan, S.C.

[21] Appl. No.: 401,679

[22] Filed: Jul. 26, 1982

[51] Int. Cl.³ .................... B65B 25/22; B65D 81/34; B32B 7/02

[52] U.S. Cl. ................................ 426/113; 426/127; 426/412; 428/35; 428/216; 428/516; 428/518; 428/520; 428/910; 428/913; 264/209.5

[58] Field of Search ............... 428/216, 516, 518, 520, 428/910, 913, 35; 426/113, 127, 412

[56] References Cited

U.S. PATENT DOCUMENTS 3,524,795 8/1970 Peterson ............................ 428/516
3,558,330 1/1971 Widiger et al. .................... 428/518
3,891,008 6/1975 D'Entremont .................. 428/516 X
4,207,363 6/1980 Lustig et al. ....................... 428/35

Primary Examiner—P. Ives
Attorney, Agent, or Firm—John J. Toney; William D. Lee, Jr.; Frank A. Peacock

[57] ABSTRACT

A pasteurizable, cook-in shrink bag is provided that comprises a first or sealing and food contact layer composed of propylene homopolymer or copolymer; a second or heat shrinkable layer composed of a blend of propylene homopolymer or copolymer and butylene homopolymer or copolymer; a third or adhesive layer composed of ethylene methacrylate copolymer; a fourth or barrier layer composed of vinylidene chloride copolymer; a fifth or adhesive layer as in said third layer; and a sixth or optical clarity layer as in said first layer; further provided that the foregoing bag structure is oriented and irradiated to a dose of about 4–12 megarads after orienting or alternatively, though less preferred, to about 6–12 megarads before orienting. Associated method for making said bag is also provided.

10 Claims, 2 Drawing Figures

PASTEURIZABLE AND COOK-IN SHRINK BAG CONSTRUCTED OF A MULTILAYER FILM

BACKGROUND OF THE INVENTION

This invention relates generally to heat shrinkable, relatively gas impermeable, thermoplastic packaging film which can be heat sealed to itself to form a flexible package. The invention relates more particularly to bags of such film for food products in which the packaged product is submerged in near boiling water or autoclaved for a substantial period of time for pasteurizing or cooking, the bag structure being shrinkable and nondegradable under such conditions.

There is a need in the food packaging industry for a packaging film from which bags can be made which are of improved structural soundness such that they may be fully characterized as pasteurizable and/or cook-in. It is desirable to have a precooked food product after the cooking process which is attractively packaged and maintained inside the film within which it was cooked.

The term "pasteurizable" as used herein is intended to refer to packaging material structurally capable of withstanding exposure to pasteurizing conditions while containing a food product. Many food products require pasteurization after they have been hermetically packaged to destroy harmful microbes which grow in the absence of air. Specific pasteurization requirements tend to vary by country; however, representative conditions are submersion of the hermetically sealed product in water at 93° C. for 3 minutes or at 85° C. for 10 minutes or at 80° C. for 20 minutes. Submersion at 95° C. for 1 hour probably represents the limiting case. Thus, for a bag to be characterized as pasteurizable, structural integrity of the bag must be maintained during pasteurization, i.e. the bag must have superior high temperature seal strength and must be delamination resistant under such time-temperature conditions. Additionally, the packaging material should be heat shrinkable under pasteurizing conditions so as to provide an attractively packaged pasteurized food product.

The term "cook-in" as used herein is intended to refer to packaging material structurally capable of withstanding exposure to cook-in time-temperature conditions while containing a food product. Cook-in packaged foods are essentially pre-packaged, pre-cooked foods that go directly to the consumer in that configuration which may be consumed with or without warning. Cook-in time-temperature conditions typically refer to a long slow cook, for example submersion in water at 70°–80° C. for 4–6 hours. Such cook-in time-temperature requirements are representative of institutional cooking requirements. Submersion at 80° C. for 12 hours probably represents the limiting case. Under such conditions, a packaging material properly characterized as cook-in will maintain seal integrity and will be delamination resistant. Additionally, the packaging film should be heat shrinkable under these conditions so as to form a tightly fitting package, and also should have good product adhesion to prevent "cook-out" or collection of juices between the surface of the food product and the interior surface of the packaging material.

Generalizing, there are a number of requirements for a pasteurizable, cook-in packaging material. It is the purpose of the present invention to provide a pasteurizable, cook-in packaging film meeting all of these requirements. First, bags made from such film must have seal integrity under such conditions, i.e. the heat sealed seams should resist being pulled apart during heat shrinking. As a corollary, the film should be heat sealable to itself. Second, such bags must be delamination resistant, i.e. the multilayers making up the film must not separate or blister. Third, the food contact layer of such film must qualify under the appropriate food laws and regulations for safe food contact. Fourth, the film must provide an oxygen and vapor barrier, i.e. must possess a low permeability to maintain the freshness of the food contained therein. Fifth, the film must be heat shrinkable in hot water under these time-temperature conditions, i.e. the film must possess sufficient shrink energy such that upon the packaged food product being submerged in hot water the packaging film will shrink snugly around the product contained therein, representatively about 30–50% biaxial shrinkage at about 90° C. Sixth, the film should possess optical clarity, i.e. the film should not become cloudly upon exposure to these time-temperature conditions so as to maintain eye appeal of the packaged product.

In general, such a multilayer film structure will have the minimal structure (sealing and food contact layer)/(shrink layer)/(barrier layer)/(sealing and food contact layer), a composite structure being required to achieve the desired composite properties of the packaging film. A typical barrier material is saran which refers to a family of thermoplastic resins, viz vinylidene chloride polymers, and copolymers of vinylidene chloride with other monomers such as vinyl chloride, acrylonitrile, methyl metacrylate, acrylates, acrylate esters, vinyl acetate, etc. Copolymers of vinylidene chloride with other monomers are generally described in terms of the weight ratio of the monomer unitls in the copolymer. Saran, by definition, has at least 50% vinylidene chloride.

A heat shrinkable, thermoplastic, multilayer packaging film which has enjoyed considerable commercial success for making bags having low gas transmission is described in U.S. Pat. No. 3,741,253 issued on June 26, 1973 to Brax et al, which relates to a multilayer film comprising a first outside layer of an irradiated ethylene vinyl acetate copolymer, a core layer of polyvinylidene chloride copolymer, and a second outside layer of an ethylene vinyl acetate copolymer. Typically the process of manufacturing this type of oriented heat shrinkable film is a tubular orientation process wherein a primary tube of the film is biaxially oriented by stretching with internal pressure in the transverse direction and the use of pin rollers at different speeds in the machine direction. After the bubble is collapsed, the film is wound up as flattened, seamless, tubular film to be used later to make bags, e.g., either end-seal bags typically made by transversely heat sealing across the width of flattened tubing followed by severing the tubing so that the transverse seal forms the bottom of a bag, or side-seal bags in which the transverse seals from the bag sides and one edge of the tubing forms the bag bottom.

This type of bag is used by placing the food product in the bag, evacuating the bag, gathering and applying a metal clip around the gathered mouth of the bag to form a hermetic seal, and then immersing the bag in a hot water bath at approximately the same temperature at which the film was stretch-oriented, typically about 160° to 205° F., hot water immersion being one of the quickest and most economical means of transferring sufficient heat to the film to shrink it uniformly. One problem which has been encountered is the failure of the bag seals at the bottom of the bags as the bag is shrunk around a product, the shrink forces tending to pull the seal apart.

Of interest concerning the present invention, is the disclosure of U.S. Pat. No. 3,808,304 for "Oriented Blends of Polypropylene and Poly-Butene-1" issued Apr. 30, 1974 to Schirmer, being directed to packaging film made of such blends and having improved heat sealing and heat shrinking properties in near boiling water.

Of interest is the disclosure of U.S. Pat. No. 3,634,553 for "Heat Shrinkable Films of Polypropylene and an Ethylene/Butene Coploymer" issued Jan. 11, 1972 to Foglia et al, being directed to oriented thermoplastic films formed from blends of a high isotactic content polypropylene with an ethylene/butene-1 copolymer containing a minor amount of ethylene.

Of interest is the disclosure of U.S. Pat. No. 4,207,363 for "Flexible Heat Shrinkable Multilayer Film for Packaging Primal Meat" issued June 10, 1980 to Lustig et al, being directed to a heat shrinkable multilayer film including a first outer layer comprising a blend of a propylene-ethylene copolymer, a butene-1/ethylene copolymer, and a thermoplastic elastomer; a first core layer capable of being stretched during orientation of the multilayer film; a second core layer serving as a oxygen barrier and being compatable to the biaxial orienting and heat shrinking of the film; and a second outer layer comprising an ethylene/vinyl acetate copolymer; the multilayer film being biaxially oriented.

Of interest is the disclosure of U.S. Pat. No. 3,891,008 for "Multilayer Thermoplastic Film and Method for Making Same" issued June 24, 1975 to D'Entremont, being directed to a polymeric composition comprising a blend of polybutene-1 with an ethylene-propylene copolymer which, when combined with a shrinkable, cross-linked polymer of ethylene, produces a laminate having improved abuse and tear resistance and reduced self-adherence.

Of interest is the disclosure of U.S. Pat. No. 3,754,063 for "Method for Casting an Inflated Tubular Polyethylene Film with Mixed Polymer of Polypropylene-Polybutene-1" issued Aug. 21, 1973 to Schirmer, being directed to a thermoplastic film having improved abuse characteristics including a layer of ethylene vinyl acetate copolymer on a tubular substrate of a predominantly ethylene polymer material with an outer layer of admixed isotactic polypropylene, polybutene-1, and atactic polypropylene, the resulting film being oriented.

SUMMARY OF THE INVENTION

The instant invention is directed to a multilayer film from which packaging bags can be made which maintain seal integrity, are delamination resistant, and are heat shrinkable during pasteurizing or cooking of a contained food product at a sustained temperature near that of boiling water.

In accordance with the invention, there is provided a pasteurizable, cook-in shrink film, including a first of sealing and food contact layer comprising propylene homopolymer or copolymer; a second or heat shrinkable layer comprising a blend of propylene homopolymer or copolymer and butylene homopolymer or copolymer; a third or adhesive layer being irradiatively crosslinkable, such as ethylene methacrylate copolymer; a fourth or barrier layer, such as vinylidene chloride copolymer; a fifth or adhesive layer as in said third layer; and a sixth or optical clarity layer as in said first layer; the foregoing film being oriented and irradiated to cross link said adhesive after orientation or alternatively, though less preferred, before orientation.

The method of the invention provides for a process for making a pasteurizable, cook-in shrink film, comprising melt forming a tubular film of the above described composite structure; orienting said tubular film; and irradiating said tubular film to crosslink said adhesive after orienting or alternatively, though less preferred, before orienting.

BRIEF DESCRIPTION OF THE DRAWINGS

Further details are given below with reference to the drawings wherein.

DESCRIPTION OF THE PREFERRED EMBODIMENTS

Figure 1:
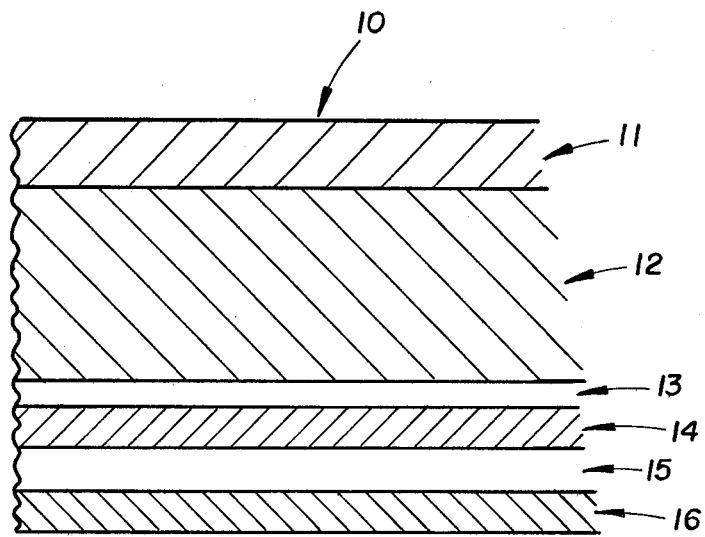
FIG. 1 is a schematic cross-section of a preferred embodiment of a multilayer film of the invention.

Referring specifically to the drawings, in FIG. 1, a schematic cross-section of a preferred embodiment of the multiply film of the invention is shown. The film structure is directed to a multilayer composite having the generalized structure of (inside) A/B/C/D/C/A (outside) where A is a sealing and food contact layer, B is a shrink layer, C is an adhesive interlayer, and D is a barrier layer. Specifically, inside layer 11 serves as a heat sealing layer and as a food contact layer and is propylene homopolymer or copolymer, and more specifically is a propylene-ethylene copolymer of low noncrystalline content, the ethylene content being minor in extent, representatively about 2 to 6%, sufficient to promote orientability. Shrink layer 12 is composed of a blend of propylene homopolymer or copolymer and butylene homopolymer or copolymer, the propylene polymer being the same as in layer 11. Preferably, the butylene polymer is butene-1/ethylene copolymer of high noncrystalline content with the ethylene content being minor in amount; representatively about 2 to 6%, sufficient to promote orientability. The blend ratio is selected so as to optimize shrink properties in near boiling water, representatively in the range of 30 to 70%, as further discussed below. Adhesive layer 13 is compatible with adjacent layers to provide delamination resistance under cook-in or pasteurizing conditions and representatively is ethylene methacrylate copolymer (EMA), such as commercially available Gulf resin 2205 being ethylene methacrylate copolymer with 20% methacrylate and balance ethylene and having a density of 0.942 and a melt index of about 2.4. Barrier layer 14 serves to inhibit transmission of oxygen and water vapor and is compatible with said adhesive layer to provide delamination resistance, and more specifically is vinylidene chloride copolymer, and in general is saran as defined above. Adhesive layer 15 is as in said layer 13. Optical clarity layer 16 is as in said layer 11 and additionally provides a pleasingly clear appearance of the film. As further discussed below, the film is oriented and then selectively irradiated to render the film delamination resistant. Representatively, the film will have an overall thickness of about 2 mils, layer 11 will have a thickness of about 0.36 mils, layer 12 about 0.89 mils, layer 13 about 0.12 mils, layer 14 about 0.20 mils, layer 15 about 0.25 mils, and layer 16 about 0.18 mils. It is noted that the exemplary structure is asymmetrical with shrink layer 12 providing the bulk of the structure and that inside layer 11 is substantially thicker than outside layer 16 to enhance sealing properties.

The terms "oriented" and/or "orientation" are used herein to describe the process and resultant product characteristics obtained by stretching a resinous orientable polymeric thermoplastic material which is heated to its orientation temperature range and then cooled in order to lock-in or freeze the molecular alignment of the material in the direction of stretching. This action improves the mechanical properties of the film, such as, for example, shrink tension and orientation release stress. These properties may be measured in accordance with ASTM D 2838. Alternatively, the extent of orientation may be characterized by the extent of unrestrained shrinkage in accordance with ASTM D 2732. The orientation temperature range for a given film will vary with the different resinous thermoplastic materials or blends thereof which comprise the film. However, the orientation temperature range may generally be stated to be above room temperature and below the melting point of the thermoplastic material or blend of materials. Orientation temperature ranges for the materials encompassed by the present application are well known to those skilled in the art. When the stretching force is applied in one direction uniaxial orientation results. When the stretching force is applied in two directions biaxial orientation results.

The term "crosslinking" is used herein to refer to the setting up of chemical links between polymer chain molecules. The extent of crosslinking may be characterized in accordance with ASTM D 2765.

Figure 2:
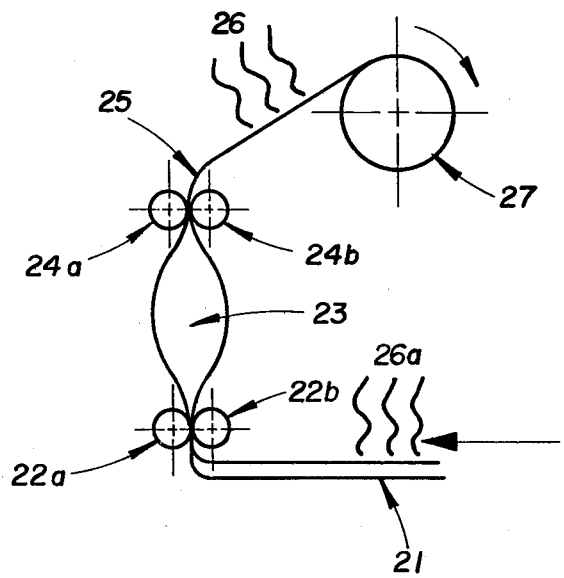
FIG. 2 is a schematic illustration of a preferred mode of making the film of the invention.

In FIG. 2, a preferred method of making the film of the invention is schematically illustrated. A preferred film such as film 10 above is melt-formed conventionally as by coextrusion (not shown) and the advancing tubular film at 21 is directed to nip rollers 22a,b and is biaxially oriented between nip roll sets 24a,b and 22a,b while subjected to internal pressurization at 23. The oriented film advancing from nip rollers 24 is then irradiated at 26 to a dose of about 4–12 megarads utilizing conventional techniques, such as electron beam radiation and gamma radiation as representatively shown in U.S. Pat. Nos. 3,330,748 and 3,022,543. At this minimum dosage, it is necessary that irradiation be conducted following orientation of the film. This general scheme is referred to as post-irradiation. Alternatively, though less preferred, irradiation may be conducted before orientation (pre-irradiation) to a dose of about 6–12 megarads as indicated at 26a. The irradiated film is finally directed to takeup roll 27 and is then ready for use in bag making.

Several aspects of the invention bear emphasis. First, considering the material of the shrink layer as generally disclosed in U.S. Pat. No. 3,808,304 referred to above, blends of polypropylene and polybutene-1 in the ratio of 30 to 70% by weight and especially about 60% are shown to have superior shrink properties in temperature ranges near that of boiling water, the temperature range of interest in the present invention for pasteurization or cook-in purposes. In the present invention and differing from the disclosure of that patent, the blended copolymers in the shrink layer are of low crystallinity initially as promoted by including minor copolymer constituents. This initial condition enhances orientability and heat shrinkability. Thus, one essential aspect of the invention involves providing a shrink layer that is acceptably shrinkable in the temperature range under pasturizing or cook-in conditions, i.e. near that of boiling water. Second, another key aspect involves providing a sealing layer that provides for high temperature resistant seals in making bags of the film while at the same time being acceptable for food contact in terms of minimum levels of extractables. Another key aspect involves delamination resistance at elevated temperatures held for extended periods of time as achieved by interlayer compatibility in the multilayer film. Irradiative crosslinking treatment has been found to be necessary in this regard for the multilayer film combination of the invention. Typically, irradiation does not increase interlayer bond strength or promote delamination resistance. Thus, surprisingly it has been discovered that irradiation according to conditions of the invention achieves the desired delamination resistance under pasteurization or cook-in conditions. Additionally, shrink compatibility among the layers of the multilayer film is another aspect in providing delamination resistance.

In use, bags are made from the film of the invention in conventional manner, as discussed above, to form either end-seal bags or side-seal bags. Eventually, the bags are loaded with a food product, sealed, and subjected to pasteurizing or cook-in treatment in near boiling water. During this food treatment, bags maintain good seal integrity, do not delaminate, and heat shrink to form a neatly packaged pretreated food product.

As an example, bags were prepared of film described above in the preferred embodiment by conventional coextrusion techniques. Samples of the bags were prepared according to the following grouping: a control group that was not irradiated; a group that was irradiated to 4 megarads (MR) prior to orientation; a group that was irradiated to 6 MR prior to orientation; and a group that was irradiated to 4 MR following orientation of the film making up the bags. The bag samples were filled with water, then submerged in water at about 95° C. for one hour, and then cooled to room temperature, corresponding to pasteurization conditions. As indicated in the data table below, the pasteurized bag samples were inspected for seal breaks, delamination, and cracking, any of which would render the bag type unacceptable for commercial use. It will be noted that two of the sample types were satisfactory in this regard, viz the sample type pre-irradiated to 6 MR and the sample type post-irradiated to 4 MR. Thus, it is seen that there is commercial advantage in post-irradiating as opposed to pre-irradiating in that a lesser dosage is required in the post-irradiation method. It will be further noted from the data table that mechanical properties were somewhat degraded in the 4 MR post-irradiation case, as well as shrink properties and optical properties. However, the degradation is not considered significant as a practical matter since the resulting property values are acceptable for commercial application. Likewise, optical clarity was degraded somewhat in the 4 MR post-irradiation case, but not being of practical significance. Gas transmission was degraded, favorably indicating increased effectiveness of barrier properties.

TABLE I

| Properties[1][2] | Effect of Irradiation (Megarads) Sample Type SDX326 | | | |
|---|---|---|---|---|
| | 0 MR | 4 MR/pre | 6 Mr/pre | 4 MR/post |
| pasteurization[4] | | | | |
| seal break | no | no | no | no |
| delamination | yes | yes | no | no |
| cracking | yes | yes | no | no |

TABLE I-continued

Effect of Irradiation (Megarads)
Sample Type SDX326

| Properties[1][2] | 0 MR | 4 MR/pre | 6 Mr/pre | 4 MR/post |
|---|---|---|---|---|
| free shrink %[7] | | | | |
| @ 185° F. | 23 | 23 | 26 | 21 |
| | (1)[3] | (2) | (2) | (1) |
| @ 205° F. | 33 | 33 | 36 | 30 |
| | (1) | (1) | (1) | (1) |
| shrink tension (psi)[8] | | | | |
| @ 185° F. | 272 | 257 | 289 | 200 |
| | (12) | (5) | (15) | (6) |
| @ 205° F. | 314 | 309 | 316 | 247 |
| | (16) | (15) | (24) | (10) |
| haze %[9] | 4.4 | 4.5 | 5.4 | 10.5 |
| | (.2) | (.8) | (1.0) | (2.6) |
| tensile strength (psi)[10] | 9600 | 9220 | 8750 | 8150 |
| | (370) | (120) | (390) | (560) |
| elastic modulus (psi)[11] | 75100 | 76400 | 75900 | 70600 |
| | (2700) | (2200) | (900) | (1700) |
| tear propagation (gms)[12] | 286 | 14 | 15 | 79 |
| | (96) | (0) | (3) | (41) |
| water vapor transmission[5] @ 100° F. | .43 | .55 | .50 | .40 |
| oxygen transmission[6] @ 73° F., 0% RH | 27 | 32 | 34 | 19 |

Notes:
[1] Properties @ 73° F. unless otherwise noted.
[2] Properties measured longitudinally.
[3] Data enclosed in parentheses refer to sample standard deviation.
[4] Test bags filled with water and submerged in water at 95° C. for 1 hour.
[5] Units of grams/(24 hours, 100 square inches); approximate at 2 mils film thickness; ASTM F372.
[6] Units of cubic centimeters STP/(24 hours, square meter, atmosphere); approximate at 2 mils film thickness; ASTM D3985.
[7] ASTM D2732.
[8] ASTM D2838.
[9] ASTM D1003 (A).
[10] ASTM D638, D882.
[11] ASTM D882 (A).
[12] ASTM D1938.

Although the present invention has been described in conjunction with preferred embodiments it is to be understood that modifications and variations may be utilized without departing from the principles and scope of the invention, as those skilled in the are will readily understand. Accordingly, such modifications and variations may be practiced within the scope of the following claims:

What is claimed is:

1. A pasteurizable, cook-in shrink bag constructed of a multilayer film comprising:
   (a) a first or sealing and food contact layer comprising propylene homopolymer or copolymer;
   (b) a second or heat shrinkable layer comprising a blend of said propylene polymer with about 30–70% by weight of butylene homopolymer or compolymer;
   (c) a third or adhesive layer being irradiatively crosslinkable and comprising a copolymer of ethylene;
   (d) a fourth or barrier layer comprising vinylidene chloride copolymer;
   (e) a fifth or adhesive layer as in said third layer; and
   (f) a sixth or optical clarity layer as in said first layer;
   (g) further provided that said film is oriented and irradiated to at least a dosage sufficient to render said film delamination resistant during pasteurizing or cooking of a food product contained in said bag.

2. The bag of claim 1 further provided that said bag is post-irradiated to crosslink said adhesive.

3. The bag of claim 1 further provided that said third layer comprises ethylene methacrylate copolymer.

4. The bag of claim 3 further provided that said bag is post-irradiated to a dose of about 4–12 megarads.

5. The bag of claim 4 wherein said dose is about 4–6 megarads.

6. The bag of claim 3 further provided that said bag is pre-irradiated to a dose of about 6–12 megarads.

7. The bag of claim 1 further provided that the blend ratio of said second layer corresponds to substantially maximum shrink properties of said bag in near boiling water.

8. The bag of claim 7 wherein said blend ratio is about 60% by weight and said butylene is butene-1.

9. The bag of claim 1 further provided that said propylene and butylene are each copolymers having a minor amount of ethylene or butylene to promote orientability.

10. The bag of claim 1 wherein said first layer has a thickness of about 0.36 mils, said second layer has a thickness of about 0.89 mils, said third layer has a thickness of about 0.12 mils, said fourth layer has a thickness of about 0.20 mils, said fifth layer has a thickness of about 0.25 mils, and said sixth layer has a thickness of about 0.18 mils, and said bag has an overall thickness of about 2 mils.

* * * * *